(12) United States Patent
Hoppensteadt et al.

(10) Patent No.: US 7,280,989 B1
(45) Date of Patent: Oct. 9, 2007

(54) PHASE-LOCKED LOOP OSCILLATORY NEUROCOMPUTER

(75) Inventors: Frank C. Hoppensteadt, Paradise Valley, AZ (US); Eugene M. Izhikevich, San Diego, CA (US)

(73) Assignee: Arizona Board of Regents, Tempe, AZ (US)

( * ) Notice: Subject to any disclaimer, the term of this patent is extended or adjusted under 35 U.S.C. 154(b) by 304 days.

(21) Appl. No.: 09/771,019

(22) Filed: Jan. 26, 2001

Related U.S. Application Data

(60) Provisional application No. 60/178,640, filed on Jan. 28, 2000.

(51) Int. Cl.
 *G06E 1/00* (2006.01)
 *G06E 3/00* (2006.01)
 *G06F 15/18* (2006.01)
 *G06G 7/00* (2006.01)
 *G06N 3/00* (2006.01)

(52) U.S. Cl. .............................. 706/30; 706/15; 706/26
(58) Field of Classification Search .................. 706/30, 706/15, 26
 See application file for complete search history.

(56) References Cited

U.S. PATENT DOCUMENTS

| | | | | |
|---|---|---|---|---|
| 4,815,475 | A | 3/1989 | Burger | 600/554 |
| 5,072,130 | A | 12/1991 | Dobson | 706/26 |
| 5,263,122 | A | 11/1993 | Nunally | 706/41 |
| 5,446,828 | A | 8/1995 | Woodall | 706/25 |
| 5,479,577 | A | 12/1995 | Yang | 706/26 |
| 5,705,956 | A | 1/1998 | Neely | 331/25 |
| 6,581,046 | B1 * | 6/2003 | Ahissar | 706/15 |

FOREIGN PATENT DOCUMENTS

WO  PCS/US99/26698  11/1999

OTHER PUBLICATIONS

Hiroaki Kurokawa, A Local Connected Neural Oscillator Network for Sequential Character Segmentation, Jun. 1997, IEEE, 0-7803-4122-8/97, 838-843.*

Hiroaki Kurokawa et al, The Stability of the Synchronization Learning of the Oscillatory Neural Networks, 1997, IEEE, 0-7803-3583-X/97, 513-516.*

Murphy et al, A Novel Learning Algorithm for Global Synchronization of Oscillatory Neural Networks, 1999, IEEE, 0-7803-5471-0/99, V-551-V-554.*

(Continued)

*Primary Examiner*—Joseph P Hirl
(74) *Attorney, Agent, or Firm*—Schwabe, Williamson & Wyatt, P.C.

(57) ABSTRACT

A neural network computer (20) includes a weighting network (21) coupled to a plurality of phase-locked loop circuits (25₁-25N). The weighting network (21) has a plurality of weighting circuits ($C_{11}, \ldots, C_{NN}$) having output terminals connected to a plurality of adder circuits (31₁-31ₙ). A single weighting element ($C_{kj}$) typically has a plurality of output terminals coupled to a corresponding adder circuit (31ₖ). Each adder circuit (31ₖ) is coupled to a corresponding bandpass filter circuit (31ₖ) which is in turn coupled to a corresponding phase-locked loop circuit (25ₖ). The weighting elements ($C_{1,1}, \ldots, C_{N,N}$) are programmed with connection strengths, wherein the connection strengths have phase-encoded weights. The phase relationships are used to recognize an incoming pattern.

41 Claims, 4 Drawing Sheets

OTHER PUBLICATIONS

Liu & Chiang, *Phase-locked Loop with neurocontroller*.
Wang, *An Oscillation Model of Auditory Stream Segregation*.
Kaburlasos; Egberg & Tacker, *Self Adaptive Multidimensional Euclidean Neural Networks for Pattern Recognition*.
Lane; Handelman & Gelfand, *Development of Adaptive B-Splines Using CMAC Neural Networks*.
Kuesewski; Myers & Steck, *Adaptive Modelling for Cognitive Structures*.
Lange; Videl & Dyer, *Phase-Locking of Artificial Neural Oscillators can Perform Dynamic Role-Binding and Inferencing*.
Endo & Kinouchi, *Neural Network with Interacting Oscillators to Generate Low Frequency Rhythm*.
Buhmann & von der Malsburg, *Sensory Segmentation by Neural Oscillators*.
Kurokawa; Ho & Mori, *A Local Connected Neural Oscillator Network for Sequential Character Segmentation*.
Hoppenstead & Izhikevich; *Optical Computation via Phase Modulation of Laser Oscillators*.
F. C. Hoppensteadt, E. Izhikevich, "Canonical Models for Bifurcations from Equilibrium in Weakly Connected Neural Networks," WCNN'95, Washington, D.C., vol. 1, pp. 180-183.
F. C. Hoppensteadt, E. M. Izhikevich, "Synaptic Organizations and Dynamical Properties of Weakly Connected Neural Oscillators," Biol. Cybern. 75, 117-127 (1996).
F. C. Hoppensteadt, E. M. Izhikevich, "Synaptic Organizations and Dynamical Properties of Weakly Connected Neural Oscillators," Biol. Cybern. 75, 129-135 (1996).
E. Ahissar, "Temporal-Code to Rate-Code Conversion by Neuronal Phase-Locked Loops," Neural Computaion 10, 597-650 (1998).

* cited by examiner

PHASE-LOCKED LOOP OSCILLATORY NEUROCOMPUTER

The present patent application claims priority rights on U.S. Provisional Patent Application Ser. No. 60/178,640 filed Jan. 28, 2000.

FIELD OF THE INVENTION

The present invention relates, in general, to computational devices and, more particularly, to a recurrent neural network computer based on phase modulation of Phase-Locked Loop (PLL) nonlinear oscillators.

BACKGROUND OF THE INVENTION

Neural network computers, are biologically inspired, that is, they are composed of elements that perform in a manner analogous to the most elementary functions of the biological neuron. In one methodology, a neural network computer is composed of a number (n) of processing elements that may be switches or nonlinear amplifiers. These elements are then organized in a way that may be related to the anatomy of the brain. The configuration of connections, and thus communication routes, between these elements represents the manner in which the neural network computer will function, analogous to that of a program performed by digital computers. Despite this superficial resemblance, such artificial neural networks exhibit a surprising number of the brain's characteristics. For example, they learn from experience, generalize from previous examples to new ones, and abstract essential characteristics from inputs containing irrelevant data. Unlike a von Neumann computer, such a neural network computer does not execute a list of commands (a program). Rather, it performs pattern recognition and associative recall via self-organization of connections between elements.

Artificial neural networks can modify their behavior in response to their environment. Shown a set of inputs (perhaps with desired outputs), they self-adjust to produce consistent responses. A network is trained so that application of a set of inputs produces the desired (or at least consistent) set of outputs. Each such input (or output) set is referred to as a vector. Training can be accomplished by sequentially applying input vectors, while adjusting network weights according to a predetermined procedure, or by setting weights a priori. During training, the network weights gradually converge to values such that each input vector produces the desired output vector.

Because of their ability to simulate the apparently oscillatory nature of brain neurons, oscillatory neural network computers are among the more promising types of neural network computers. Simply stated, an oscillatory neural network computer includes oscillators. Oscillators are mechanical, chemical or electronic devices that are described by an oscillatory signal (periodic, quasi-periodic, almost periodic function, etc.) Usually the output is a scalar function of the form $V(\omega t + \phi)$ where V is a fixed wave form (sinusoid, saw-tooth, or square wave), $\omega$ is the frequency of oscillation, and $\phi$ is the phase deviation (lag or lead).

Recurrent neural networks have feedback paths from their outputs back to their inputs. The response of such networks is dynamic in that after applying a new input, the output is calculated and fed back to modify the input. The output is then recalculated, and the process is repeated again and again. Ideally, successive iterations produce smaller and smaller output changes until eventually the outputs become steady oscillations or reach a steady state. Although these techniques have provided a means for recognizing signals, to date they have not been able to do so using associative memory.

Accordingly, a need exists for a neural network computer with fully recurrent capabilities and a method that incorporates the periodic nature of neurons in the pattern recognition process.

SUMMARY OF THE INVENTION

In accordance with the present invention, an oscillatory neural network computer is disclosed that exhibits pattern recognition using the phase relationships between a learned pattern and an incoming pattern, i.e., the pattern to be recognized.

In one aspect of the present invention, the oscillatory neural network computer comprises a weighting circuit having phase-based connection strengths. A plurality of phase-locked loop circuits are operably coupled to the weighting circuit.

In another aspect of the present invention, a method for programming an oscillatory neural network computer is provided wherein programming comprises encoding connection coefficients of the oscillatory neural network computer in accordance with phase relationships of a pattern to be learned.

In yet another aspect of the present invention, a method for recognizing an incoming pattern using an oscillatory neural network computer is provided wherein the method comprises using the phase deviation between a learned pattern and the incoming pattern to create an output signal indicative of the learned pattern.

DETAILED DESCRIPTION

The oscillatory neural network computer of the present invention learns or memorizes information in terms of periodic waveforms having an amplitude, a frequency, and a phase. This information is encoded as connection strengths, $S_{k,j}$, using a learning rule such as, for example, the Hebbian learning rule. The connection strengths, in combination with phase-locked loop circuitry, are used to recognize information from signals transmitted to the oscillatory neural network computer.

Copending U.S. patent application Serial No. PCT/US99/26698, entitled "OSCILLATORY NEUROCOMPUTER WITH DYNAMIC CONNECTIVITY" and filed Nov. 12, 1999 by Frank Hoppensteadt and Eugene Izhikevich is hereby incorporated herein by reference in its entirety.

Figure 1:
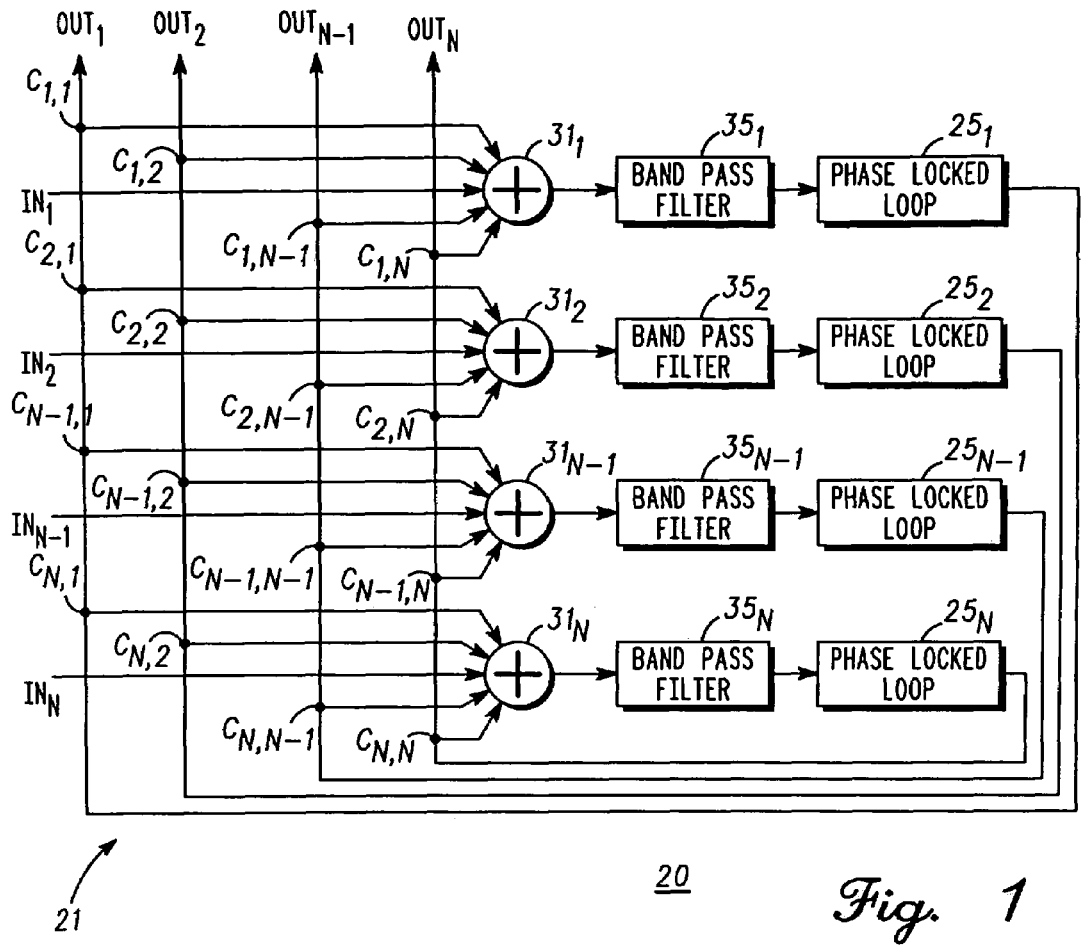
FIG. 1 schematically illustrates an oscillatory neural network computer in accordance with an embodiment of the present invention.

FIG. 1 schematically illustrates an oscillatory neural network computer 20 in accordance with an embodiment of the present invention. Oscillatory neural network computer 20 comprises a weighting network 21 coupled in a feedback configuration to a plurality of phase-locked loop circuits $25_1, \ldots, 25_{N-1}, 25_N$. Oscillatory neural network computer 20 has output terminals $OUT_1, OUT_2, \ldots, OUT_{N-1}, OUT_N$ for transmitting output signals $V(\theta_1), V(\theta_2), \ldots, V(\theta_{N-1}), V(\theta_N)$, respectively, where the output signals $V(\theta_1), V(\theta_2), \ldots, V(\theta_{N-1}), V(\theta_N)$ have equal frequencies and constant, but not necessarily zero, phase relationships. More particularly, weighting network 21 includes a plurality $C_{1,1}, C_{1,2}, \ldots, C_{N,N}$ of weighting circuits, a plurality $31_1, \ldots, 31_N$ of adder circuits, and a plurality $35_1, 35_N$ of bandpass filter circuits. Weighting circuits $C_{1,1}, C_{1,2}, \ldots, C_{N,N}$ are configured as an N×N matrix. By way of example, weighting network 21 is a symmetric matrix of weighting circuits where each weighting element is coupled for transmitting an output signal having a connection strength, $S_{k,j}$, associated therewith. The connection strength is also referred to as the connection weight, the connection coefficient, the interunit connection strength, or simply the strength or weight. It should be understood that reference number 25 is used to collectively identify the plurality of phase-locked loop circuits, reference number 31 is used to collectively identify the plurality of adder circuits, and reference number 35 is used to collectively identify the plurality of bandpass filter circuits. The subscript notation (1, 2, . . . , N) has been appended to reference numbers 25, 31, and 35 to identify individual phase-locked loop circuits, adder circuits, and bandpass filter circuits, respectively. Further, the weighting circuits may also be referred to as connectors or weighting elements.

Weighting circuits $C_{1,1}, C_{1,2}, \ldots, C_{1,N-1}, C_{1,N}$ are connected to the input terminals of adder circuit $31_1$ and to the respective output terminals $OUT_1, OUT_2, \ldots, OUT_{N-1}, OUT_N$. Weighting circuits $C_{2,1}, C_{2,2}, \ldots, C_{2,N-1}, C_{2,N}$ are connected to the input terminals of adder circuit $31_2$, to the input terminals of the respective weighting elements $C_{1,1}, C_{1,2}, \ldots, C_{1,N-1}, C_{1,N}$ and to the respective output terminals $OUT_1, OUT_2, \ldots, OUT_{N-1}, OUT_N$. Weighting circuits $C_{N-1,1}, C_{N-1,2}, \ldots, C_{N-1,N-1}, C_{N-1,N}$ are connected to the input terminals of adder circuit $31_{N-1}$ and to the respective output terminals $OUT_1, OUT_2, \ldots, OUT_{N-1}, OUT_N$. Weighting circuits $C_{N,1}, C_{N,2}, \ldots, C_{N,N-1}, C_{N,N}$ are connected to the input terminals of adder circuit $31_N$ and to the respective output terminals $OUT_1, OUT_2, \ldots, OUT_{N-1}, OUT_N$.

Further, initialization input terminals $IN_1, IN_2, \ldots, IN_{N-1}, IN_N$, are coupled to initialization input terminals of adder circuits $31_1, 31_2, \ldots, 31_{N-1}, 31_N$, respectively. The output terminals of adder circuits $31_1, 31_2, \ldots, 31_{N-1}, 31_N$ are connected to the input terminals of bandpass filter circuits $35_1, 35_2, \ldots, 35_{N-1}, 35_N$, respectively.

The output terminals of bandpass filter circuits $35_1, 35_2, \ldots, 35_{N-1}, 35_N$ are connected to the input terminals of phase-locked loop circuits $25_1, 25_2, \ldots, 25_{N-1}, 25_N$, respectively. The output terminals of phase-locked loop circuits $25_1, 25_2, \ldots, 25_{N-1}, 25_N$ are connected to the respective output terminals $OUT_1, OUT_2, \ldots, OUT_{N-1}, OUT_N$.

Figure 2:
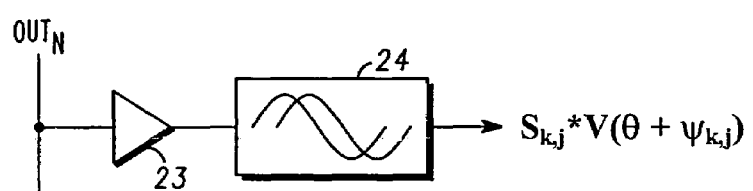
FIG. 2 schematically illustrates a weighting element in accordance with an embodiment of the present invention.

FIG. 2 schematically illustrates an embodiment of a weighting circuit ($C_{1,1}, C_{1,2}, \ldots, C_{N,N}$) in accordance with the present invention. In this embodiment, weighting circuits $C_{1,1}, C_{1,2}, \ldots, C_{N,N}$ comprise a linear amplifier 23 having an input terminal connected to a respective output terminal $OUT_1, OUT_2, \ldots, OUT_{N-1}, OUT_N$. An output terminal of linear amplifier 23 is connected to an input terminal of phase shift circuit 24. An output terminal of phase shift circuit 24 is connected to a corresponding adder circuit 31. The output signal appearing on the output terminal of phase shift circuit 24 is:

$$S_{k,j} * V(\theta + \psi_{k,j}) \qquad (1)$$

where $S_{k,j}$ is the connection strength (gain) of weighting circuit $C_{k,j}$ provided by its linear amplifier 23; and $\psi_{k,j}$ is the phase shift introduced by phase shift circuit 24 of the weighting circuit.

Referring to FIGS. 1 and 2, PLL neural network 20 is a dynamic system that is described mathematically as $$d\theta_k(t)/dt = \Omega + V(\theta_k) \sum_{j=1}^{n} S_{k,j} * V(\theta_j - \pi/2) \qquad (2)$$

for k=1, . . . , N, where:

$\theta_k$ is the phase of the VCO embedded in the $k^{th}$ PLL circuit;

$\theta_j$ is the phase of the VCO embedded in the $j^{th}$ PLL circuit;

$\Omega$ is the natural frequency of the VCO in MegaHertz (MHz);

$S_{k,j}$ are the connection strengths; and $V(\theta)$ is a $2\pi$ periodic waveform function.

PLL neural network computer 20 has an arbitrary waveform function, V, that satisfies "odd-even" conditions and if connection strengths $S_{k,j}$ are equal to connection strengths $S_{j,k}$ for all k and j, then the network converges to an oscillatory phase-locked pattern, i.e., the neurons or phase-locked loop circuits oscillate with equal frequencies and constant, but not necessarily zero, phase relationships. Thus, the phase relationships between the oscillators can be used to determine the connection strengths of a neural network computer.

Figure 3:
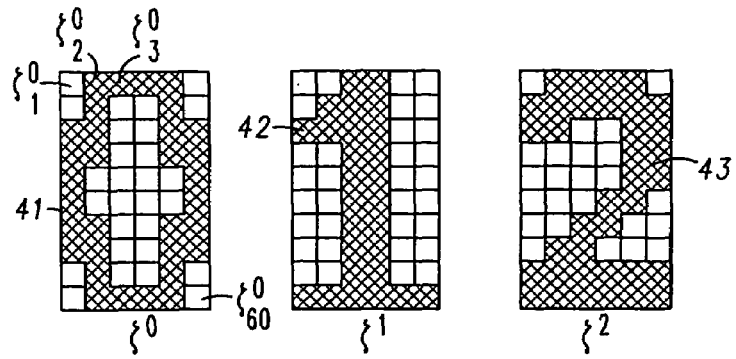
FIG. 3 illustrates patterns to be memorized by the oscillatory neural network computer.

An example of using phase relationships to train neural network computer 20 is described with reference to FIGS. 1, 2, and 3. FIG. 3 illustrates three patterns to be memorized that correspond to the images or symbols "0", "1", and "2," and which are identified by reference numbers 41, 42, and 43, respectively. The phase relationships of a set of key vectors ($\xi^m$) or patterns of the images are initially memorized using a well known learning rule such as, for example, the Hebbian learning rule. (Other suitable learning rules include the back propagation learning rule, the template learning rule, the least squares learning rule, the correlation learning rule, the perceptron learning rule as well as other supervised and nonsupervised learning rules). In accordance with the Hebbian learning rule, the images are described as a set of key vectors:

$$\xi^m = (\xi^m_1, \xi^m_2, \ldots, \xi^m_N), \xi^m_k = \pm 1, m = 0, \ldots, r, \text{ and}$$
$$k = 1, \ldots, N \qquad (3)$$

where
- m identifies the pattern to be memorized;
- r+1 is the number of patterns to be recognized; and
- N is the number of phase-locked loop circuits, i.e., the number of neurons.

Still referring to FIG. 3, patterns "0", "1", and "2" are partitioned into sixty (N=60) pixels or subunits, $P_1$, $P_2$, ..., $P_{60}$, which are described by key vectors $\xi^0$, $\xi^1$, $\xi^2$, respectively, which key vectors are to be memorized or recognized by oscillatory neural network computer 20. For the image or symbol "1," $\xi^1_1$ is the vector component of the first pixel, $P_1$; $\xi^1_2$ is the vector component of the second pixel, $P_2$; $\xi^1_3$ is the vector component of the third pixel, $P_3$; $\xi^1_4$ is the vector component of the fourth pixel, $P_4$, etc. It should be noted that in this example, vector component $\xi^1_1$ describes a white pattern, vector component $\xi^1_2$ describes a white pattern, vector component $\xi^1_3$ describes a black pattern, vector component $\xi^1_4$ describes a black pattern, etc. Key vectors are also determined for the images "0" and "2." When $\xi^m_k = \xi^m_j$, the $k^{th}$ and the $j^{th}$ oscillators are in phase, i.e., $\phi_k = \phi_j$, and when $\xi^m_k = -\xi^m_j$, the $k^{th}$ and the $j^{th}$ oscillators are anti-phase, i.e., $\theta_k = \theta_j + \pi$. It should be noted that the number of pixels into which the images are partitioned is not a limitation of the present invention.

The key vectors are used in conjunction with the learning rule to determine the connection coefficients of oscillatory neural network computer 20. In the example of using the Hebbian learning rule to memorize the images, the connection coefficients, $S_{k,j}$ are given by:

$$S_{k,j} = (1/n) \sum_{m=0}^{m=r} \xi^m_k \xi^m_j \quad (3)$$

An advantage of using the Hebbian learning rule to determine the connection coefficients is that it produces symmetric connections $S_{k,j}$ so that the network always converges to an oscillatory phase-locked pattern, i.e., the neurons oscillate with equal frequencies and constant, but not necessarily zero, phase relations. It should be understood that some information about each memorized image is included in each connection coefficient.

After the initial strengths are memorized, neural network computer 20 is ready for operation, which operation is described with reference to FIGS. 1-8.

Figure 4:
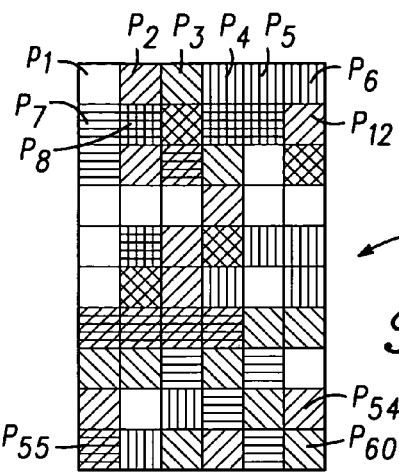
FIG. 4 illustrates a pattern to be recognized in accordance with an embodiment of the present invention.

FIG. 4 illustrates a pattern 44 to be recognized which is a degraded or distorted version of the image "1" illustrated in FIG. 3 and previously memorized. In operation, the pattern to be recognized, i.e., pattern 44, is parsed into a desired number of pixels. Each pixel will correspond to a PLL circuit. Each PLL circuit is the equivalent of a neuron, in our use of the term. In the example shown in FIGS. 4-8 pattern 44 is parsed into sixty pixels, $P_1$-$P_{60}$. Thus, oscillatory neural network computer 20 will contain sixty PLL circuits, $25_1$-$25_{60}$. At time t=0, oscillatory neural network computer 20 is initialized such that the initial signals on PLL circuits $25_1$-$25_{60}$ represent degraded pattern 44. By way of example, PLL circuits $25_1$-$25_{60}$ are initialized by applying an external signal at input terminals $IN_1$, ..., $IN_N$ of the form:

$$I_k(t) = A_k \cos(\Omega t + \phi_0) \quad (4)$$

for k=1, ..., 60, where:
- $\Omega$ is the same as the center frequency of the PLL;
- $\phi_0$ is an arbitrary constant;
- $A_k$ are large numbers that are positive if the input for the $k^{th}$ channel is to be initialized at +1 and are negative if the $k^{th}$ channel is to be initialized at a −1.

After an initialization interval, the external inputs are turned off and the network proceeds to perform its recognition duties.

Another suitable method for initializing neural network computer 20 is to start the PLL circuits of PLL 25 such that they have different phases that represent pattern 44. Yet another suitable method is to start the PLL circuits of PLL 25 such that they have the same phase and then shift the phase in accordance with pattern 44. Yet another suitable method is to set the initial voltages of the loop filters associated with each PLL circuit of PLL 25. It should be understood that the method for initializing oscillatory neural network computer 20 is not a limitation of the present invention.

Still referring to FIG. 4, at time t=0, pattern 44 is such that the image or value for the pixel $P_1$ associated with key vector $\xi^1_1$ is white, the image or value for the pixel $P_2$ associated with key vector $\xi^1_2$ is black, the image or value of the pixel $P_3$ associated with key vector $\xi^1_3$ is black, the image or value of the pixel $P_4$ associated with key vector $\xi^1_4$ is white, the image or value of the pixel $P_5$ associated with key vector $\xi^1_5$ is white, the image or value of the pixel $P_6$ associated with key vector $\xi^1_6$ is white, the image or value of the pixel $P_7$ associated with key vector $\xi^1_7$ is white, the image or value of the pixel $P_8$ associated with key vector $\xi^1_8$ is black, ..., the image or value of the pixel $P_{60}$ associated with key vector $\xi^1_{60}$ is black. It should be understood that the superscripted number 1 indicates this is the phase pattern being recognized, as opposed to a "0" or a "2."

Figure 5:
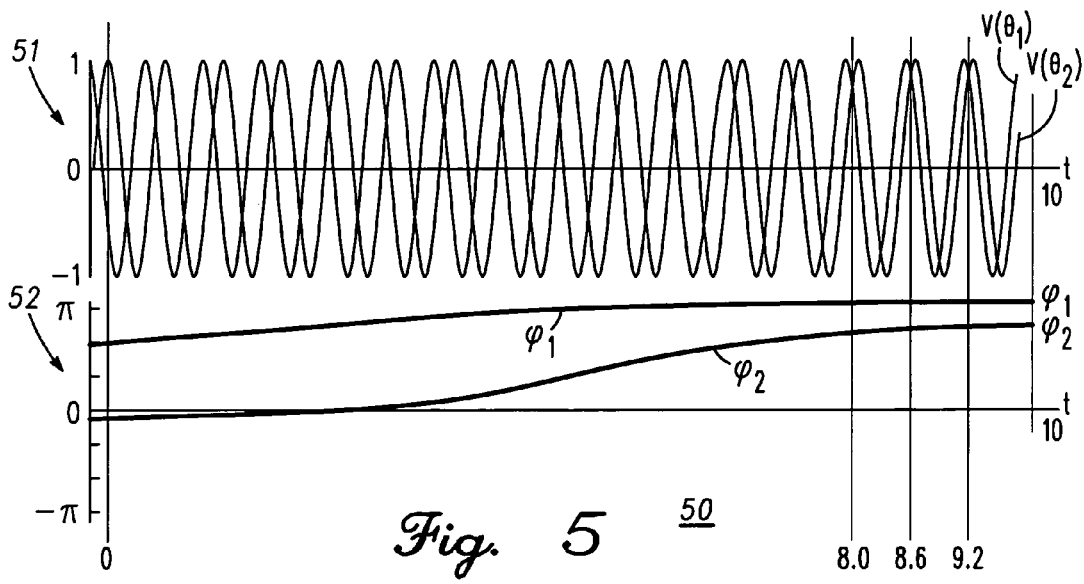
FIG. 5 is a plot of the frequency and the phase portions of output signals of the oscillatory neural network computer in accordance with the present invention.

FIG. 5 is a plot 50 of the frequency 51 and the phase 52 portions of output signals, $V(\theta_1)$ and $V(\theta_2)$, of PLL circuits $25_1$ and $25_2$, respectively, (FIG. 1). At time t=0, the amplitude of output signal $V(\theta_2)$ is +1 and the phase $\phi_2$ is approximately 120 degrees ($2\pi/3$) which corresponds to the white image associated with key vector $\xi^1_1$; whereas at time t=0 the amplitude of output signal $V(\theta_2)$ is −1 and the phase $\phi_2$ is approximately 0 degrees which corresponds to the black image associated with key vector $\xi^1_2$.

Figure 6:
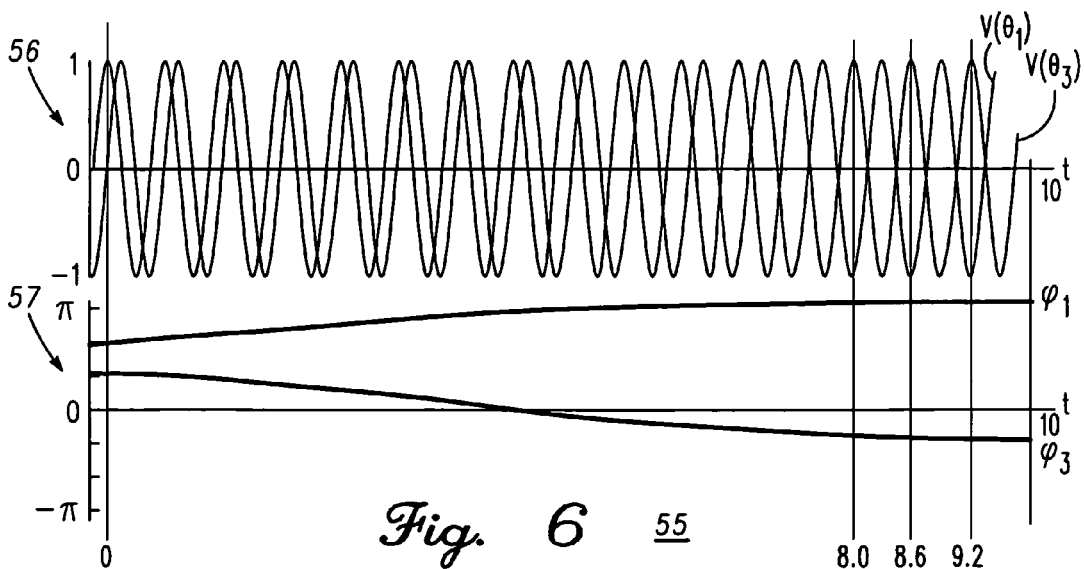
FIG. 6 is a plot of the frequency and the phase portions of other output signals of the neural network computer in accordance with the present invention.

FIG. 6 is a plot 55 of the frequency 56 and the phase 57 portions of output signals, $V(\theta_1)$ and $V(\theta_3)$, of PLL circuits $25_1$ and $25_3$, respectively, (FIG. 1). At time t=0, the amplitude of output signal $V(\theta_1)$ is +1 and the phase $\phi_1$ is approximately 120 degrees ($2\pi/3$) which corresponds to the white image associated with key vector $\xi^1_1$; whereas at time t=0 the amplitude of output signal $V(\theta_3)$ is −1 and the phase $\phi_3$ is approximately 0 degrees which corresponds to the black image associated with key vector $\xi^1_3$.

Although not shown, it should be understood that there are corresponding output signals $V(\theta_4)$, ..., $V(\theta_{60})$ that occur for each of the respective PLL circuits $25_4$, ..., $25_{60}$.

Plots 50 and 55 further illustrate pattern recognition in accordance with an embodiment of the present invention. Because the patterns of the individual pixels that have been learned are either black or white, output signals $V(\theta_1)$, ..., $V(\theta_{60})$ lock in phase or in anti-phase to each other depending on the pattern being recognized. For example, in the pattern for a "1" (FIG. 3) pixels $P_1$, $P_2$, $P_5$, and $P_6$ are white and pixels $P_3$ and $P_4$ are black. Thus, when this pattern is recognized from pattern 44, PLL circuits $25_1$, $25_2$, $25_5$, and $25_6$ should lock in phase to each other and PLL circuits $25_3$ and $25_4$ should lock in phase to each other. Further, the PLL circuits for pixels that are of opposite color should lock in anti-phase to each other, i.e., pixels that are white should lock in anti-phase or out of phase to pixels that are black. This is illustrated for PLL circuits $25_1$ and $25_2$ in FIG. 5 and for PLL circuits $25_1$ and $25_3$ in FIG. 6. Referring to FIG. 5, output signals $V(\theta_1)$ and $V(\theta_2)$ have a substantially constant in-phase relationship to each other by time t=8.0, i.e., the difference in their phases ($\phi_1$-$\phi_2$) is less than 30 degrees. It should be understood that an acceptable error value for the phase difference of a signal locked in-phase is a design choice. It should be further understood that the units for time are not included for the sake of clarity. Thus, the units for the time may be seconds, milliseconds, microseconds, etc.

Briefly referring to FIG. 6, output signals $V(\theta_1)$ and $V(\theta_3)$ have a substantially constant anti-phase relationship to each other by time t=8.0, i.e., the difference in their phases ($\phi_1$-$\phi_3$) is greater than approximately 150 degrees. It should be understood that an acceptable error value for the phase difference of a signal locked in anti-phase is a design choice.

Figure 7:
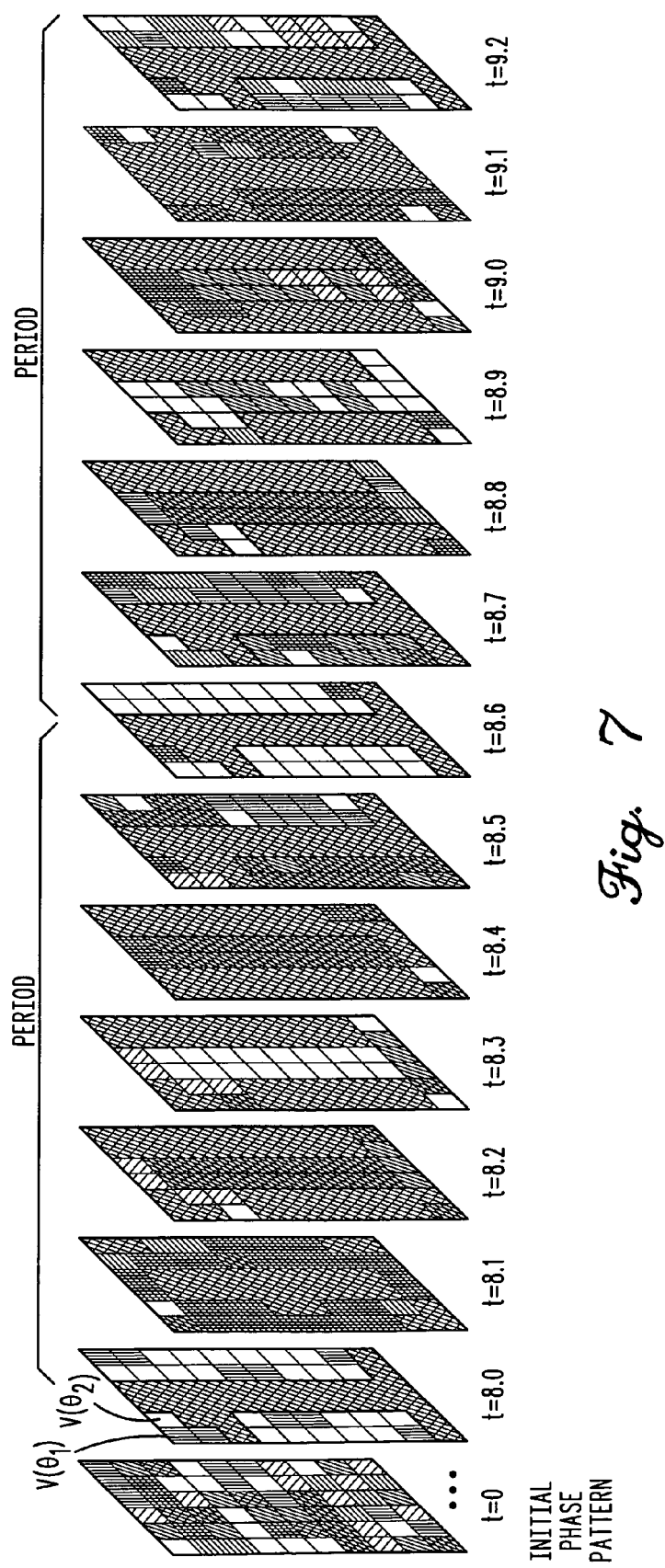
FIG. 7 illustrates the output signals to the pixels during the recognition process in accordance with the present invention.

FIG. 7 illustrates the visual outputs for pixels $P_1, \ldots, P_{60}$ from time t=8.0 to time t=9.2. At times t=8.0, 8.6, and 9.2, pixels $P_1$ and $P_2$ are white, whereas at times t=8.3, 8.9, and 9.5 pixels $P_1$ and $P_2$ are black. It is expected that at times t=8.0, 8.6, and 9.2, the output signals for pixels $P_1$ and $P_2$ would have substantially the same amplitude and polarity and be in phase and at times t=8.3, t=8.9, and t=9.5, the output signals for pixels $P_1$ and $P_2$ would have substantially the same amplitude and polarity and be in phase. Comparing these times with the output signals shown in FIG. 5, at times t=8.0, t=8.6, and t=9.2 output signals $V(\theta_1)$ and $V(\theta_2)$ have an amplitude of +1 and are substantially in phase. Likewise, at times t=8.3, t=8.9, and t=9.5 output signals $V(\theta_1)$ and $V(\theta_2)$ have an amplitude of −1 and are substantially in phase.

Further, it is expected that at times t=8.0, 8.3, 8.6, 8.9, 9.2, and 9.5, the output signals for pixels $P_1$ and $P_3$ would be in anti-phase and have amplitudes of substantially the same magnitude but opposite polarity. Comparing these times with the output signals shown in FIG. 6, at times t=8.0, 8.6, and 9.2 output signal $V(\theta_1)$ has an amplitude of +1 and $V(\theta_3)$ has an amplitude of −1, and at times t-8.3, t=8.9, and t=9.5 output signal $V(\theta_1)$ has an amplitude of −1 and $V(\theta_3)$ has an amplitude of +1.

Figure 8:
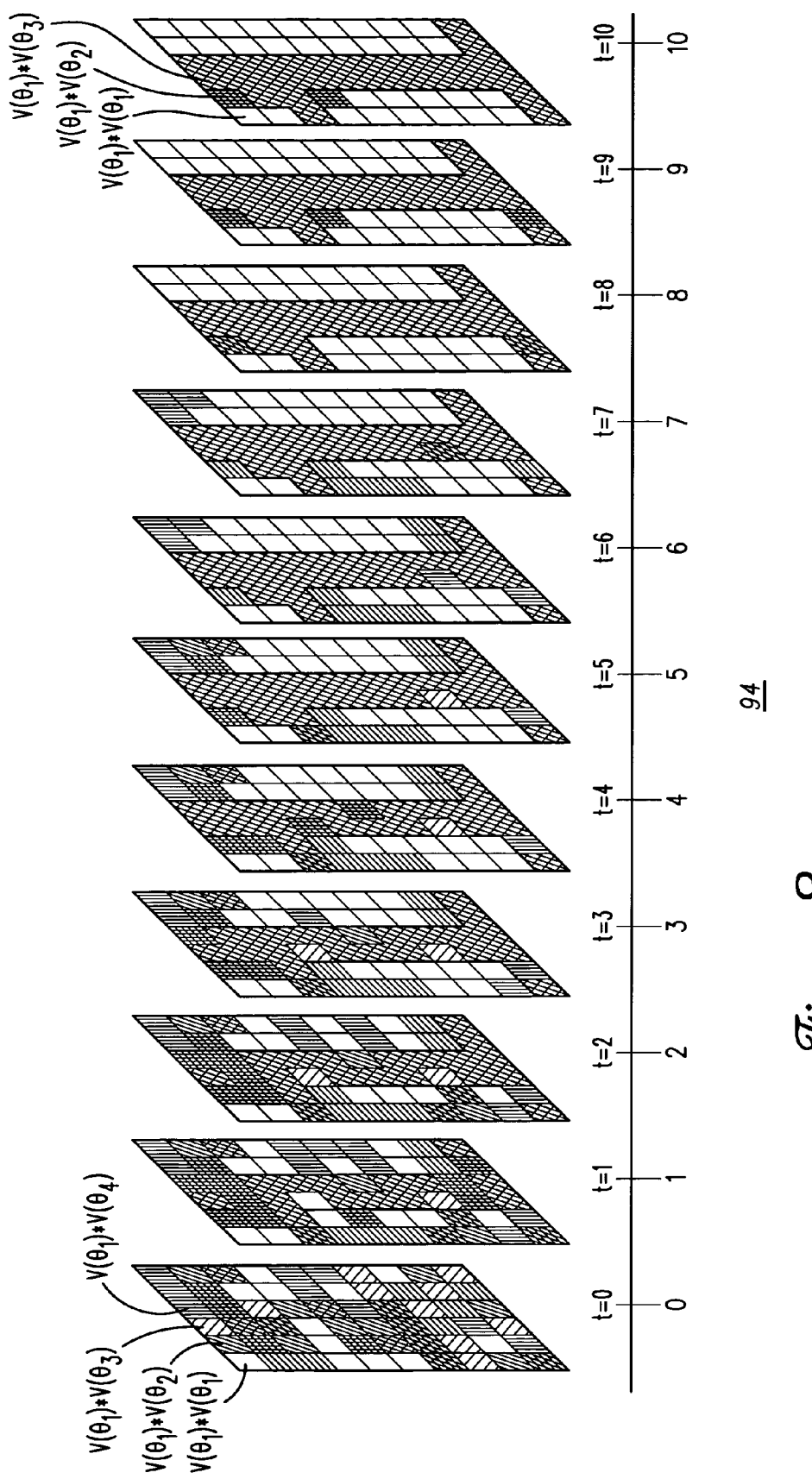
FIG. 8 illustrates the products of the output signals to the pixels of FIG. 7.

The output signals of neural network computer 20 can be monitored by multiplying each output signal with a reference output signal. In the example of recognizing pattern 44 from FIG. 4, the output signals of each of pixels $P_1, \ldots, P_{60}$ are multiplied with that of pixel $P_1$. The result of this multiplication is a new sixty pixel image where the image of new pixel $P_{1new}$ is the product of output $V(\theta_1)$ with itself; the image of new pixel $P_{2new}$ is the product of output signals $V(\theta_1)$ and $V(\theta_2)$; the image of new pixel $P_{3new}$ is the product of output signals $V(\theta_1)$ and $V(\theta_3)$; the image of new pixel $P_{4new}$ is the product of output signals $V(\theta_1)$ and $V(\theta_4)$, etc. This result is illustrated in FIG. 8 where the products are shown at time intervals t=0, t=1, t=2, . . . , t=10.

By now it should be appreciated that a method for recognizing patterns and an oscillatory neural network computer for implementing the method have been provided. An important aspect of this invention is the discovery by the inventors that the output signals for a PLL neural network computer oscillate with equal frequencies and constant, but not necessarily zero, phase relationships. Thus, the phase relationships of the neural network computer are used to determine the connection strengths of the neural network computer. This provides an increased immunity to noise. Another advantage of the present invention is that the type of learning rule used to train the neural network computer is not a limitation of the present invention.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. An oscillatory neural network computer, comprising:
    a weighting network having a plurality of output terminals, the weighting network having phase-based connection strengths; and
    a plurality of phase-locked loop circuits operably coupled with said weighting network;
    the weighting network having inputs operably coupled to outputs of the phase-locked loops and having outputs operably coupled to inputs of the phase-locked loops.

2. The oscillatory neural network computer of claim 1, wherein the weighting circuit further includes a plurality of initialization input terminals.

3. The oscillatory neural network computer according to claim 1, wherein the phase-based connection strengths of the weighting network are strengths imparted to the weighting network representing a plurality of patterns recognizable by the oscillatory neural network computer.

4. The oscillatory neural network according to claim 1, wherein the outputs of the weighting network are coupled to the phase-locked loop circuits via band pass filters.

5. An oscillatory neural network computer, comprising:
    a weighting network having a plurality of output terminals, the weighting network having phase-based connection strengths; and
    a plurality of phase-locked loop circuits operably coupled with said weighting network, wherein the weighting network comprises:
    first and second weighting circuits, each of the first and second weighting circuits having input and output terminals;
    a first adder circuit having first and second input terminals and an output terminal, the first input terminal of the first adder circuit coupled to the output terminal of the first weighting circuit and the second input terminal of the first adder circuit coupled to the output terminal of the second weighting circuit; and
    a first bandpass filter circuit having input and output terminals, the input terminal of the first bandpass filter circuit coupled to the output terminal of the first adder circuit.

6. The oscillatory neural network computer of claim 5, further including:
    third and fourth weighting circuits, each of the third and fourth weighting circuits having input and output terminals;
    a second adder circuit having first and second input terminals and an output terminal, the first input terminal of the second adder circuit coupled to the output terminal of the third weighting circuit and the second input terminal of the second adder circuit coupled to the output terminal of the fourth weighting circuit; and
    a second bandpass filter circuit having input and output terminals, the input terminal of the second bandpass filter circuit coupled to the output terminal of the second adder circuit.

7. The oscillatory neural network computer of claim 5, wherein the plurality of phase-locked loop circuits comprises a phase-locked loop circuit having an output terminal coupled to the input terminal of the first weighting circuit.

8. The oscillatory neural network computer of claim 7, further including a first initialization input terminal coupled to the first adder circuit.

9. An oscillatory neural network computer, comprising:
a weighting network having a plurality of output terminals, the weighting network having phase-based connection strengths; and
a plurality of phase-locked loop circuits operably coupled with said weighting network, wherein the weighting network comprises a plurality of weighting circuits coupled to a plurality of bandpass filter circuits through a plurality of adder circuits.

10. The oscillatory neural network computer of claim 9, wherein each weighting circuit comprises a linear amplifier.

11. The oscillatory neural network computer of claim 10, wherein each weighting circuit further comprises a phase shift circuit coupled to the linear amplifier.

12. An oscillatory neural network computer, comprising:
a weighting network having a plurality of output terminals, the weighting network having phase-based connection strengths; and
a plurality of phase-locked loop circuits operably coupled with said weighting network, wherein the network comprises a plurality of phase shift circuits each phase shift circuit connected in a weighting circuit operably connected to an input of one of the phase-locked loops.

13. An oscillatory neural network computer, comprising:
a plurality of connectors, wherein each connector has a phase-encoded connection coefficient; and
phase-locked loops having a plurality of oscillators operably coupled with said plurality of connectors, each of the connectors having means for establishing a gain and a phase shift circuit.

14. An oscillatory neural network computer, comprising:
a plurality of connectors, wherein each connector has a phase-encoded connection coefficient;
a plurality of oscillators operably coupled with said plurality of connectors; and
a plurality of adder circuits coupled between the plurality of connectors and said plurality of oscillators.

15. An oscillatory neural network computer, comprising:
a plurality of connectors, wherein each connector has a phase-encoded connection coefficient;
a plurality of oscillators operably coupled with said plurality of connectors;
a plurality of adder circuits coupled between the plurality of connectors and said plurality of oscillators; and
a plurality of bandpass filter circuits coupled between said plurality of adder circuits and said plurality of oscillators.

16. The oscillatory neural network computer of claim 15, wherein the plurality of connectors comprises first, second, third, and fourth connectors, the plurality of adder circuits comprises at least two adder circuits, and wherein the output terminals of first and second connectors are coupled to the input terminals of a first adder circuit and the output terminals of third and fourth connectors are coupled to the input terminals of the second adder circuit.

17. The oscillatory neural network computer of claim 16, wherein the plurality of oscillators includes a first oscillator having an output terminal coupled to the first and third connectors and a second oscillator having an output terminal coupled to the second and fourth connectors.

18. The oscillatory neural network computer of claim 17, further including a first initialization terminal coupled to the first adder circuit and a second initialization terminal coupled to the second adder circuit.

19. The oscillatory neural network computer according to claim 15, wherein the adder circuits are coupled to the oscillators via band pass filters.

20. An oscillatory neural network computer, comprising:
a plurality of connectors, wherein each connector has a phase-encoded connection coefficient;
a plurality of oscillators operably coupled with said plurality of connectors; and
the plurality of connectors comprises a linear amplifier coupled to a phase shift circuit.

21. A method for recognizing an incoming pattern using a neural network computer comprising using a phase deviation between signals representing a learned pattern and signals representing the incoming pattern to create an output signal indicative of the learned pattern including encoding connection coefficients of the neural network computer in accordance with phase representations of the signals representing a learned pattern.

22. The method of claim 21, wherein using the phase deviation comprises encoding connection coefficients of the neural network computer in accordance with phase representations of signals representing a plurality of learned patterns to be distinguished among by the neural network computer.

23. A method for programming a neural network computer comprising providing at least one pattern to be learned, encoding connection coefficients for connected elements of the neural network computer in accordance with phase relationships among oscillatory signals of the neural network computer, which phase relationships are representative of the pattern to be learned.

24. The method of claim 23, further comprising providing an oscillatory neural network, initializing the network by applying initializing signals to multiple initializing inputs, and after initializing feeding back to multiple connector outputs of multiple phase-locked loops amplifying, at the connectors, the outputs fed back thereto, phase shifting the outputs fed back thereto and applying the amplified, phase-shifted outputs to inputs of the phase-locked loops.

25. The method for programming a neural network computer in accordance with claim 24, wherein encoding connection coefficients comprises establishing the gains of a plurality of amplifiers connected between outputs of a plurality of phase-locked loops and a plurality of inputs to the phase-locked loops.

26. The method of programming a neural network computer according to claim 25, further comprising applying the outputs of individual phase-locked loops to multiple amplifiers connected to inputs to the multiple phase-locked loops.

27. The method of programming a neural network computer according to claim 26, further comprising phase-shifting the outputs of the amplifiers being applied to inputs to the multiple phase-locked loops.

28. The method according to claim 23, wherein encoding connection coefficients comprises encoding connection coefficients of the neural network computer in accordance with the phase relationships among signals representing a plurality of patterns to be learned.

29. An oscillatory neural network computer, comprising:
a weighting network having a plurality of output terminals, the weighting network having phase-based connection strengths; and
a plurality of phase-locked loop circuits operably coupled with said weighting network, wherein the weighting network comprises a plurality of weighting circuits having input terminals operably coupled to the output terminals and output terminals operably coupled to the phase-locked loop circuits, the weighting circuits having an output signal of substantially the form:

$$S_{k,j} * V(\theta + \psi_{k,j})$$

where:
$S_{k,j}$ is the connection strength (gain) of a weighting circuit $C_{k,j}$, and $\psi_{k,j}$ is phase shift introduced by the weighting circuit $C_{k,j}$.

30. The oscillatory neural network computer according to claim 29, wherein each weighting circuit comprises an amplifier operably coupled to one of the output terminals and a phase shift circuit operably coupled to one of the phase-locked loops, the amplifier having substantially the gain S and the phase shift circuit having substantially the phase shift $\psi$.

31. The oscillatory neural network computer according to claim 30, wherein the phase shift circuit is operably coupled to the one of the phase-locked loops through an adder circuit and a band pass filter.

32. The oscillatory neural network according to claim 31, wherein the adder circuit and band pass filter are connected in series between the phase shift circuits and the phase-locked loops.

33. An oscillatory neural network computer, comprising:
a weighting network having a plurality of output terminals, the weighting network having phase-based connection strengths; and
a plurality of phase-locked loop circuits operably coupled with said weighting network,
wherein the neural network is a dynamic system that is described mathematically substantially as:

$$d\theta_k(t)/dt = \Omega + V(\theta_k) \sum_{j=1}^{n} S_{k,j} * V(\theta_j - \pi/2)$$

for k=1, . . . ,N, where:
$\theta_k$ is the phase of a voltage controlled oscillator embedded in the $k^{th}$ phase-locked loop circuit;
$\theta_j$ is the phase of the voltage controlled oscillator embedded in the $j^{th}$ phase-locked loop circuit;
$\Omega$ is the natural frequency of the voltage controlled oscillator in MegaHertz (MHz);
$S_{k,j}$ are the connection strengths; and
$V(\theta)$ is a $2\pi$ periodic waveform function.

34. The oscillatory neural network computer according to claim 33, wherein the weighting network comprises a plurality of weighting circuits, each of the weighting circuits comprising an amplifier operably coupled to one of the output terminals and a phase shift circuit operably coupled to one of the phase-locked loops.

35. The oscillatory neural network computer according to claim 34, wherein each phase shift circuit is operably coupled to the one of the phase-locked loops through an adder circuit and a band pass filter.

36. An oscillatory neural network computer comprising a plurality of n phase-locked loops, where n is a positive number in excess of 3, a plurality of n adder circuits, a plurality of $n^2$ weighting circuits operably connecting an output of each of the phase-locked loops to each of the n adder circuits, and a plurality of n initialization input terminals each connected to one of the adder circuits.

37. The oscillatory neural network computer according to claim 36, wherein each weighting circuit includes an amplifier and a phase shift circuit operably coupled between the phase-locked loop outputs and one of the adder circuits.

38. The oscillatory neural network computer according to claim 37, wherein each adder circuit is operably coupled to a phase-locked loop through a band pass filter.

39. An oscillatory neural network computer, comprising:
a weighting network having a plurality of output terminals, the weighting network having phase-based connection strengths; and
a plurality of phase-locked loop circuits operably coupled with said weighting network;
the weighting network being outside the phase-locked loop circuits and having inputs operably coupled to outputs of the phase-locked loops and having outputs operably coupled to inputs of the phase-locked loops.

40. The oscillatory neural network computer according to claim 39, wherein the phase-based connection strengths are strengths derived from signals input to the oscillatory neural network computer representative of a plurality of learned patterns to be recognized and distinguished by the oscillatory neural network computer.

41. An oscillatory neural network computer, comprising:
a weighting network having a plurality of output terminals, the weighting network having phase-based connection strengths; and
a plurality of phase-locked loop circuits operably coupled with said weighting network, wherein the network comprises a plurality of phase shift circuits each phase shift circuit connected in a weighting circuit external to the phase-locked loop circuits operably connected to an input of one of the phase-locked loops.

* * * * *